(12) United States Patent
Fenkanyn et al.

(10) Patent No.: US 8,063,742 B2
(45) Date of Patent: *Nov. 22, 2011

(54) TESTING APPARATUS FOR EMBEDDED RFID TAGS

(75) Inventors: John Michael Fenkanyn, Akron, OH (US); Richard Nicholas Crano, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 305 days.

This patent is subject to a terminal disclaimer.

(21) Appl. No.: 12/568,043

(22) Filed: Sep. 28, 2009

(65) Prior Publication Data

US 2011/0074549 A1    Mar. 31, 2011

(51) Int. Cl.
*H04Q 5/22* (2006.01)
*G08B 13/14* (2006.01)
*G01N 3/00* (2006.01)
*G01P 15/08* (2006.01)

(52) U.S. Cl. ....... 340/10.1; 340/514; 340/10.4; 340/5.6; 340/572.1; 73/788; 73/838; 257/417; 257/419

(58) Field of Classification Search ........................ None
See application file for complete search history.

(56) References Cited

U.S. PATENT DOCUMENTS

| 4,739,257 | A  | * | 4/1988  | Jenson et al.   | 324/750.08 |
|-----------|----|---|---------|-----------------|------------|
| 6,810,750 | B1 | * | 11/2004 | Kiefer et al.   | 73/801     |
| 2008/0145188 | A1 | * | 6/2008 | Kamphuis et al. | 414/14     |
| 2008/0185705 | A1 | * | 8/2008 | Osborn et al.   | 257/690    |

* cited by examiner

*Primary Examiner* — Jennifer Mehmood
*Assistant Examiner* — Fekadeselassie Girma
(74) *Attorney, Agent, or Firm* — Richard B. O'Planick (57) ABSTRACT

A testing apparatus includes an elongate carrier strip encapsulating an electronic device such as an RFID tag therein. The apparatus includes multiple rollers positioned in sequence and defining a serpentine path for receiving and supporting a carrier strip mid-portion. A drive mechanism engages the end portions of the strip and reciprocally moves the strip mid-portion in a forward direction and a reverse direction against curved surfaces of the rollers. A reader is further provided and positioned to detect the presence or absence of transmission error by the electronic device as the strip mid-portion reciprocally moves in the forward and reverse directions over the apparatus support surface during a testing sequence.

6 Claims, 7 Drawing Sheets

TESTING APPARATUS FOR EMBEDDED RFID TAGS

FIELD OF THE INVENTION

The invention relates generally to testing apparatus for RFID tags and, more specifically, to testing apparatus for mechanically testing RFID tags embedded within a carrier medium.

BACKGROUND OF THE INVENTION

It is desirable to mechanically ensure that different RFID tag designs perform as intended and are durable when subjected to stresses and strains attendant use of the tags in a product environment. Such RFID tags are commonly embedded within a particular carrier material or medium when used in conjunction with various products. An economical and reliable tester is accordingly desired to ensure the durability of embedded RFID tags for their intended purpose.

SUMMARY OF THE INVENTION

According to an aspect of the invention, a testing apparatus is provided for an electronic tag of a type that transmits information from a host product to a reader during the course of commercial end product use. The apparatus includes an elongate carrier strip composed of a material having material properties simulating an end product material within which the tag resides embedded during end product use, the tag being substantially embedded within the carrier strip at a mid-portion between opposite end portions of the strip. The apparatus includes a roller having a convex support surface operationally positioned to support the carrier strip mid-portion; and a drive mechanism engaging the end portions of the strip for reciprocally moving the strip mid-portion in a forward direction and a reverse direction over the roller curved surface. A reader is further provided and positioned to receive information transmitted from the electronic tag as the strip mid-portion reciprocally moves in the forward and reverse directions over the apparatus support surface during a testing sequence.

According to another aspect, the roller outer surface has a radius of curvature sufficient to stress the electronic tag as the strip mid-portion moves axially over the apparatus support surface in order to simulate a tire curvature within which the tag resides embedded during tire use.

The support roller is mounted within an apparatus frame to reciprocally move against a spring bias in a direction normal to the convex outer surface of the support roller.

In another aspect of the invention, a second and a third roller may be mounted within the apparatus frame adjacent to the support roller to define a serpentine path for the carrier strip. The rollers engage the carrier strip mid portion to reproduce a magnitude of stress and strain within the electronic device similar to that experienced in a tire. Throughout cycle testing, the reader detects the presence or absence of transmission error by the electronic device.

BRIEF DESCRIPTION OF THE DRAWINGS

The invention will be described by way of example and with reference to the accompanying drawings in which.

DETAILED DESCRIPTION OF THE INVENTION

Figure 1:
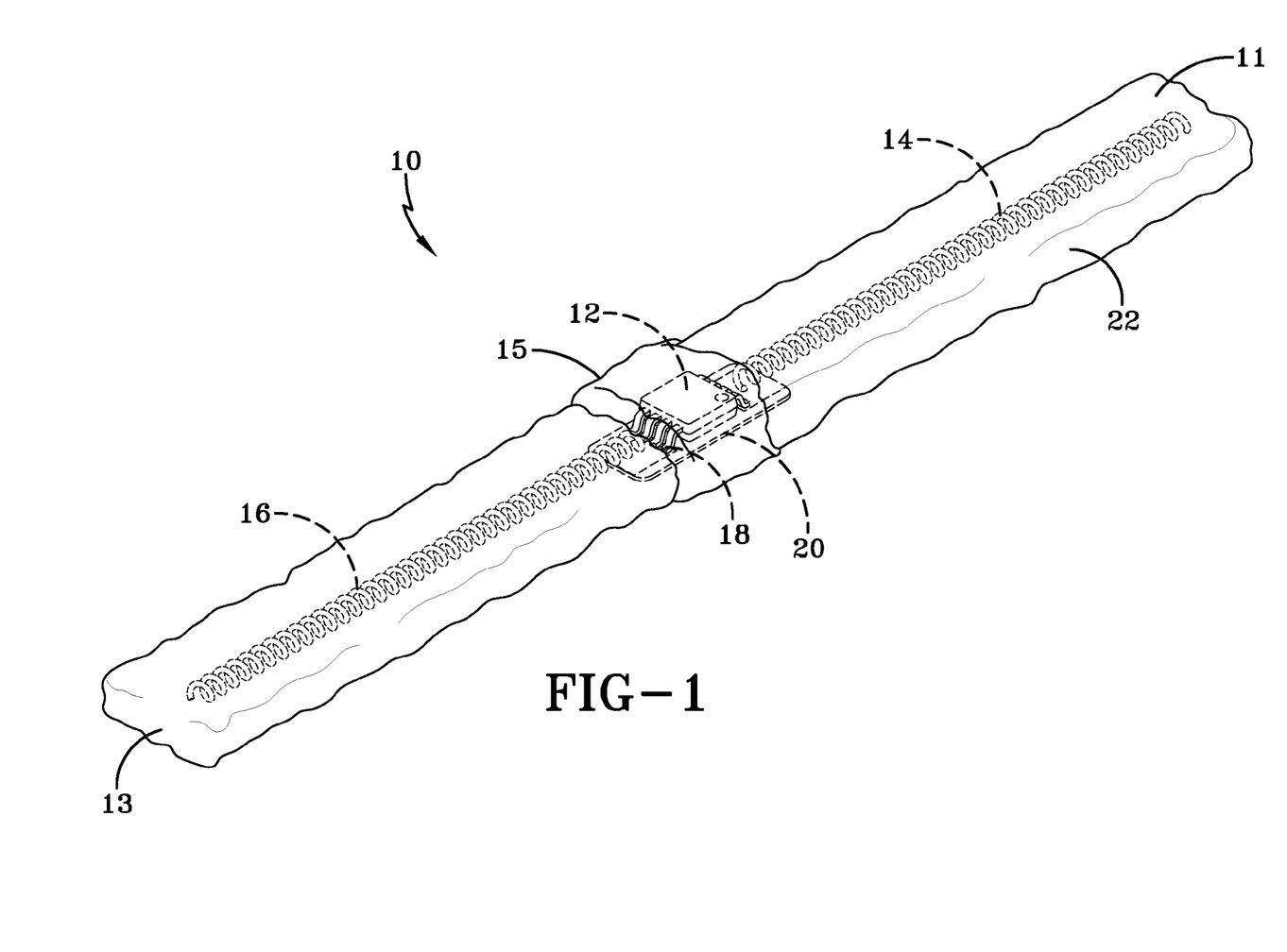
FIG. 1 is a perspective view of a carrier strip and electronic device assembly for testing.

Referring first to FIG. 1, a tag sample 10 is shown to include an IC (integrated circuit) component 12 such as an RFID device capable of storing data and transmitting such data as necessary for a particular application. RFID tags are used in sundry product applications where it is desirable to secure the tag within or to a product and access product related information from the tag when needed. In the particular application shown, the RFID tag is suitable for embedded incorporation into a tire. So situated within an end tire product, information stored within the RFID tag circuit component 12 may be accessed to retrieve product specific information.

In the tag design shown, the circuit component 12 is electrically and mechanically coupled to a pair of coiled segments 14, 16 of a dipole antenna. The component 12 utilizes the antenna to transmit data to a remote reader system as will be explained. The antenna segments 14, 16 are secured by means contacts 18 to the electronic device 12 that is mounted to a substrate 20. For the purpose of the subject durability test, the tag assembly consisting of device 12, substrate 20, and antenna segments 16, 18 are encapsulated within a strip 22 composed of material intended to simulate the material in which the tag will be embedded in a particular product application. For a tire, the tag assembly is embedded within a rubber compound having material properties similar to that portion of a tire into which the tag is to be incorporated. A rubber strip 22 of 1 inch by 7 inches dimensions may be used. The RFID tag is cured into the strip material to replicate the targeted product material environment into which the RFID tag will be placed. Prior to incorporation into an actual product, it is desired to test the tag for RF performance as well as to test the durability of the embedded RFID tag so that comparisons can be made. Moreover, it is desired that such tests be made in order to act as a screen for tag designs before tires are built and tested in order to determine tag durability.

Also, in tire related tests, many variables are present that can skew results of RFID tag performance if test conditions inadvertently vary. Therefore, the subject invention creates a simple testing apparatus that can under controlled conditions accurately determine the durability of an RFID tag under conditions which simulate those encountered within a tire.

The testing sample 10 is thus constructed as an elongate strip wherein the RFID tag is embedded within a mid-portion 15 of the strip, generally equidistant from the ends 11,13. The strip opposite ends 11, 13 extend a distance from the mid-portion carrying the embedded RFID tag as shown in FIGS. 2, 3, 4, and 5. The rubber material 22 into which the tag is embedded is selected to replicate the tire component into which the tag will eventually be embedded. The test apparatus thus can measure tag durability within an environment closely replicating the material properties of the eventual finished product.

The testing apparatus in a single roller embodiment is shown in FIGS. 2, 3, 4, and 5. A freestanding base 26 has a rearwardly positioned pedestal block 28 positioned thereon. A rearward panel 30 extends upward from the block 28 to a cantilevered top support block 32 which extends from the panel 30 generally parallel with the bottom block 28. A roller 34 is positioned upon a forward portion of the base 26. The roller is attached by a center pin 36 to a connector block 38. A pair of spaced apart vertically positioned shafts 40 A,B have opposite ends anchored within the blocks 32, 28 as shown and extend through channels extending through the connector block 38. Upper and lower pairs of coil springs 42 A, B and 44A, B, respectively, are positioned to surround upper and lower ends of the vertical shafts 40A, B on opposite sides of the connector block 38. The connector block 38 carrying the roller 34 is free to slide reciprocally in the vertical direction along the shafts 40A, B. The springs 42A, B and 44A, B serve as a spring suspension to the roller 34 and act to keep the roller centered and at a constant level.

Figure 2:
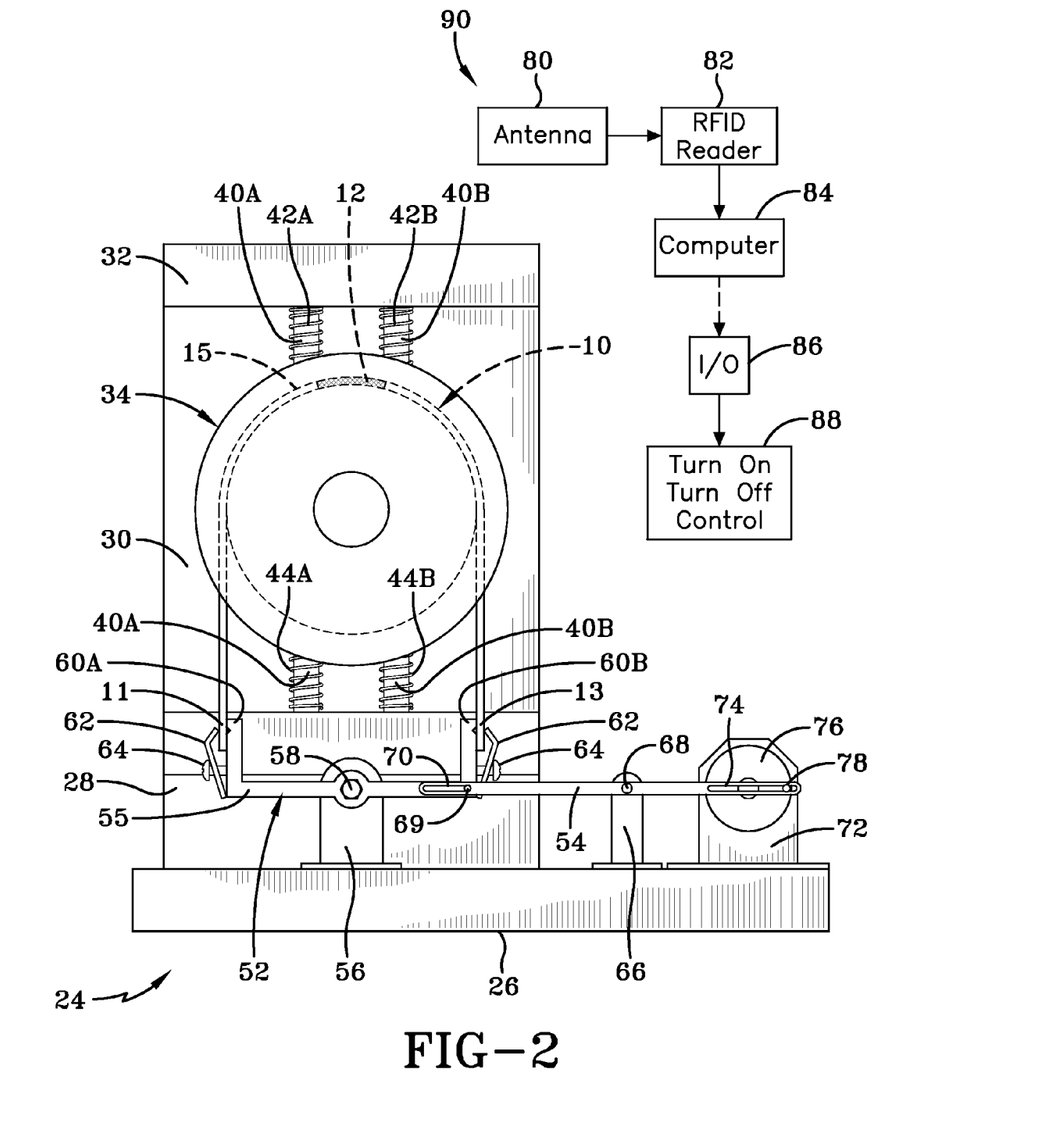
FIG. 2 is a front plan view and schematic of a single roller testing apparatus.
Figure 3:
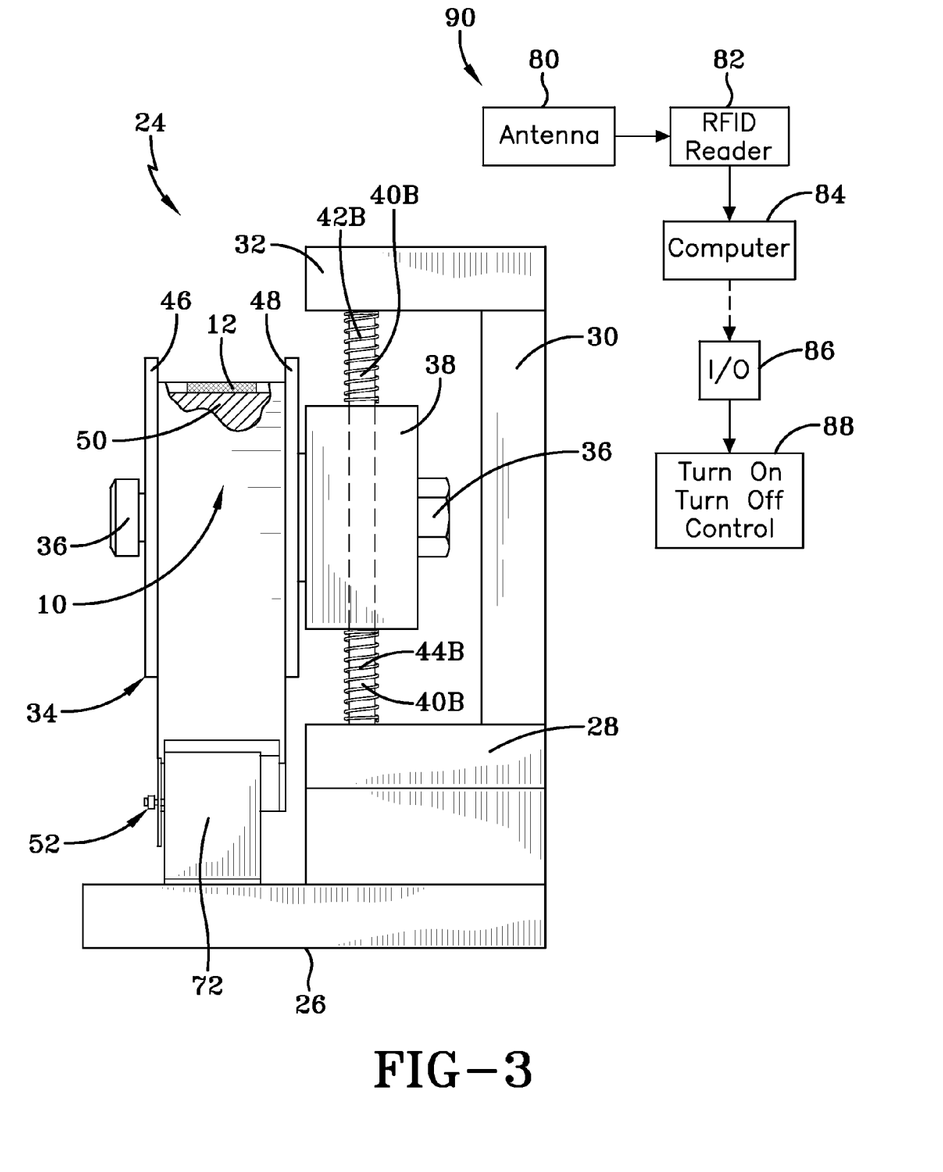
FIG. 3 is a side elevational view thereof.

The roller 34 has a pair of spaced apart circumferentially extending outwardly directed flanges 46, 48 that border a central circumferential support surface 50. The specimen mid-portion 15 of specimen 10 is supported by the roller support surface 50 positioned between the flanges 46, 48. A drive mechanism 52 is provided having a pivot arm 54 coupled to a pivot linkage 55. The pivot linkage 55 is mounted pivotally by pin 58 to a support block 56 secured to the base 26. The pivot linkage 52 is formed having a pair of spaced apart upturned arm ends 60A, B. Each linkage end 60A, B has a respective clamping finger mechanism 62 that mounts to the arm end by means of a set screw 64. The pivot arm 54 is pivotally coupled to a base-mounted block 66 by a pivot pin 69. A slot 70 at the forward end of the arm 54 receives a pin 69 secured to the pivot linkage 55, whereby coupling the arm 54 to the linkage 55.

A drive motor 72 is mounted to the base 26 and includes a circular rotational drive plate 76 having a peripheral pin 78 that rides within a rearwardly disposed slot 74 of the pivot arm 54. The pivot arm 54 is coupled to the rotational plate 76 and is pivoted in a vertical direction about pedestal 66 as the plate rotates. Pivotal movement of the arm 54 initiates a pivotal movement of the linkage 55 about pedestal 56 as shown in FIGS. 4 and 5.

A reader system 90 is operationally positioned proximate to the test apparatus 24 and is seen to include an antenna 80, a RFID reader 82, a computer 84, an input/output connection 86 and an on/off control 88. The components 80, 82, 84, 86, and 88 are of a type commercially available. The antenna 80 is positioned to receive RFID signals from a tag specimen 10 as the specimen 10 is subjected to a durability testing cycle. The specimen 10 is positioned over the roller surface 50 with the specimen mid-portion 15 generally centered over surface 50. The roller surface 50 has a radius of curvature generally analogous to the tire component into which the specimen 10 will be embedded throughout its commercial use. Thus, the specimen 10 will be subjected to the same curvature induced stresses and strains as would be expected from its incorporation into an intended end product. In addition, the rubber compound 22 is selected to exhibit the same material properties as the tire component material into which the tag will be embedded throughout commercial use in an end product. The selection of rubber and the shape and curvature of the roller, as a result, subjects the tag 10 to a stress and strain environment similar to that present within an end product tire. The test results will accordingly accurately reflect the performance of the tag in an actual end product use environment.

Figure 4:
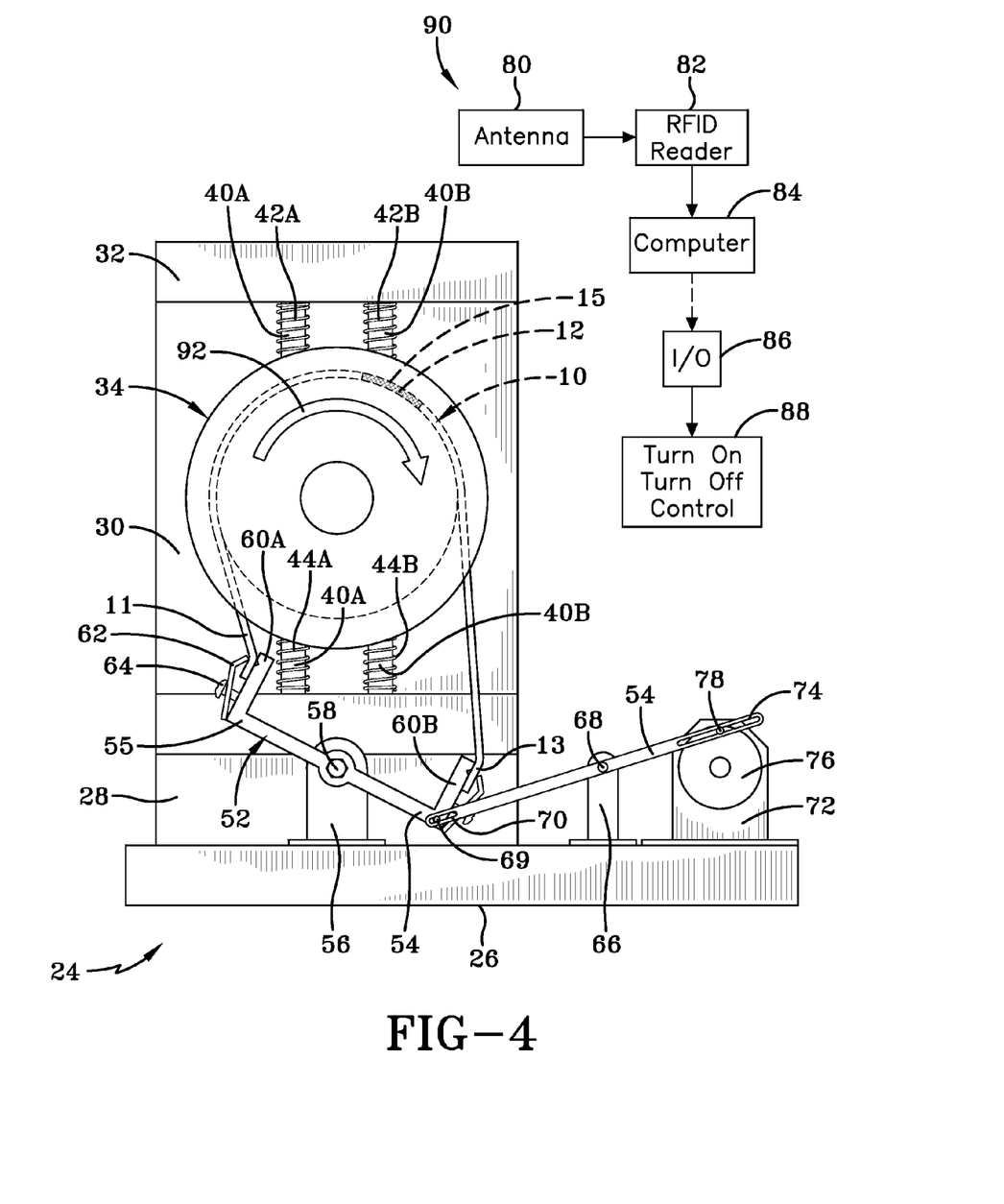
FIG. 4 is a front plan view showing a drive mechanism moving a test sample in a forward direction.
Figure 5:
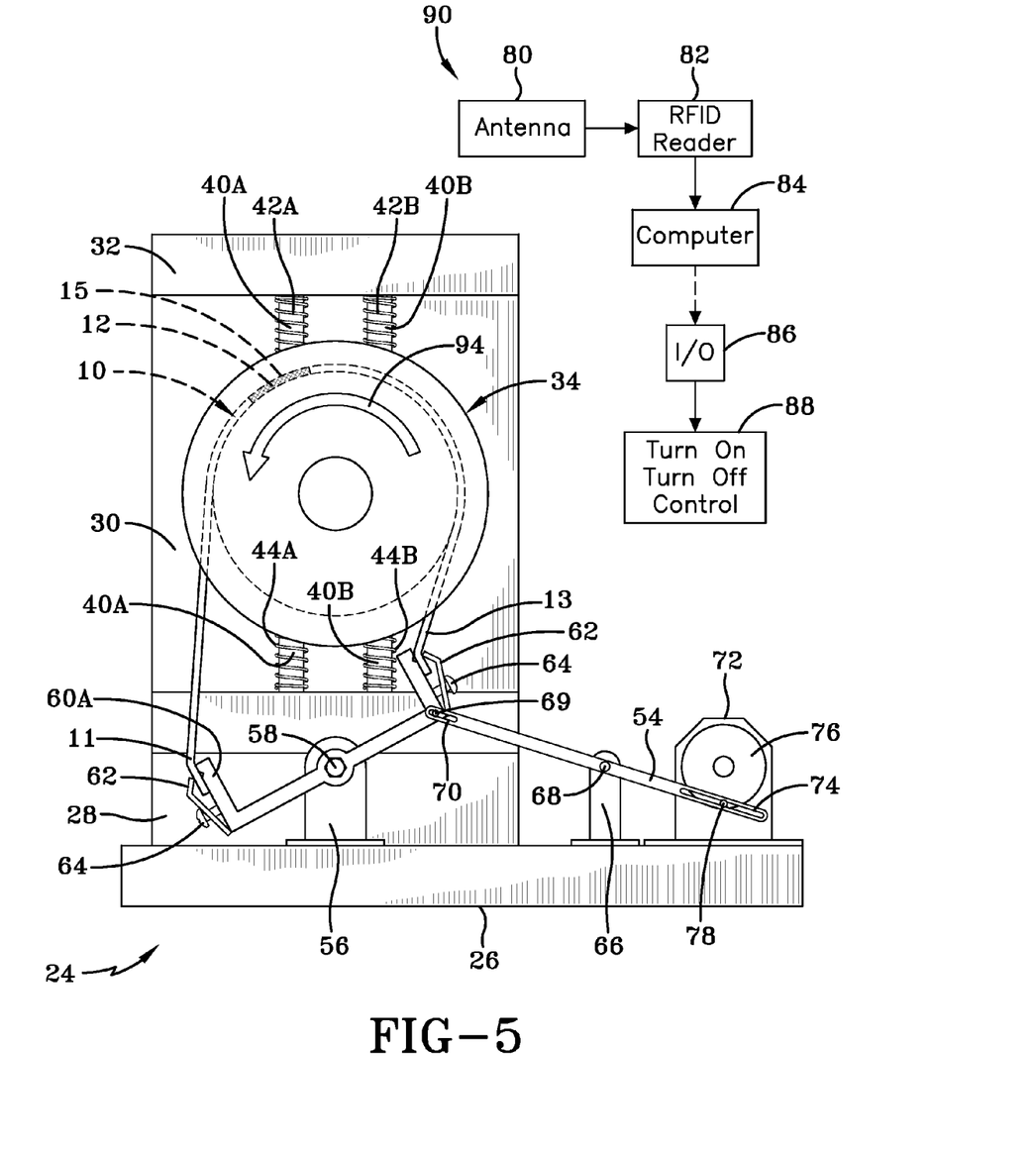
FIG. 5 is a front plan view showing the drive mechanism moving the test sample in a reverse direction.

As shown in FIGS. 4 and 5, the ends 11, 13 of the specimen 10 are captured between the clamping fingers 62 and respective linkage ends 60A, B of the pivot linkage 55. Pivotal movement of the linkage 55 will those impose a reciprocal movement of the specimen tag mid-portion 15, including the specimen IC package 12, antenna, 14, 16, contacts 18, and substrate 20 over the radius of roller surface 50. The reciprocal movement of the specimen mid-portion 15 over surface 50 in the clockwise and counterwise directions is shown in FIGS. 4, 5. As the specimen 10 moves over surface 50 in direction 92 and back 94, RFID transmissions from the tag are monitored by the reader system 90 on a regular (preferably continuous) basis. Any malfunction of the specimen tag 10 that causes a disruption or degradation in transmission signal will be detected by the reader system 90 and noted electronically. The frequency and number of reciprocal cycles of the tag back and forth against roller surface 50 may be designed to test the durability of the tag and its signal transmission components.

The purpose of the test described is to test the durability of different tag designs embedded in rubber. The tag samples 10 are formed as rubber strips, preferably 1 inch by 7 inches into which the RFID tag is cured. The samples are tested for RF performance and comparisons can be made between the various tag designs. As a result of the durability testing, the tag designs may be screened for durability before tires are built and tested. The subject testing procedure and apparatus by subjecting the various samples to a repeatable testing methodology on a standardized apparatus, eliminates the various variables that could otherwise skew results should test conditions vary. The apparatus consists of a single mechanical roller 34 of a diameter that will stress the antenna and RFID electronics package (IC, board, etc.) as the sample rolls across the roller. The tag is bound on the ends with a see-saw type mechanism (linkage 55, arm 54, etc.) that is driven by motor 72. The up and down movement of the linkage causes the tag to move up and down across the roller 34.

The operating procedure for the test apparatus 24 proceeds as follows. The tag sample 10 is positioned over the roller 34 and its ends secured to the linkage 55. The reader system 90 is turned on by switch 88 to initiate receipt of RFID signals from the tag by the RFID reader 82. Movement of the tag sample 10 over the roller is then initiated by the linkage and drive mechanisms for a predetermined number of cycles. Throughout the cycles, the RFID reader 82 monitors the transmission of signals from the tag and detects the presence or absence of transmission defects or degradation. A record of the transmissions is kept by the computer 84. At the conclusion of the durability test cycle, the drive mechanism and reader system are turned off and the tag disengaged from the linkage 55.

Figure 6:
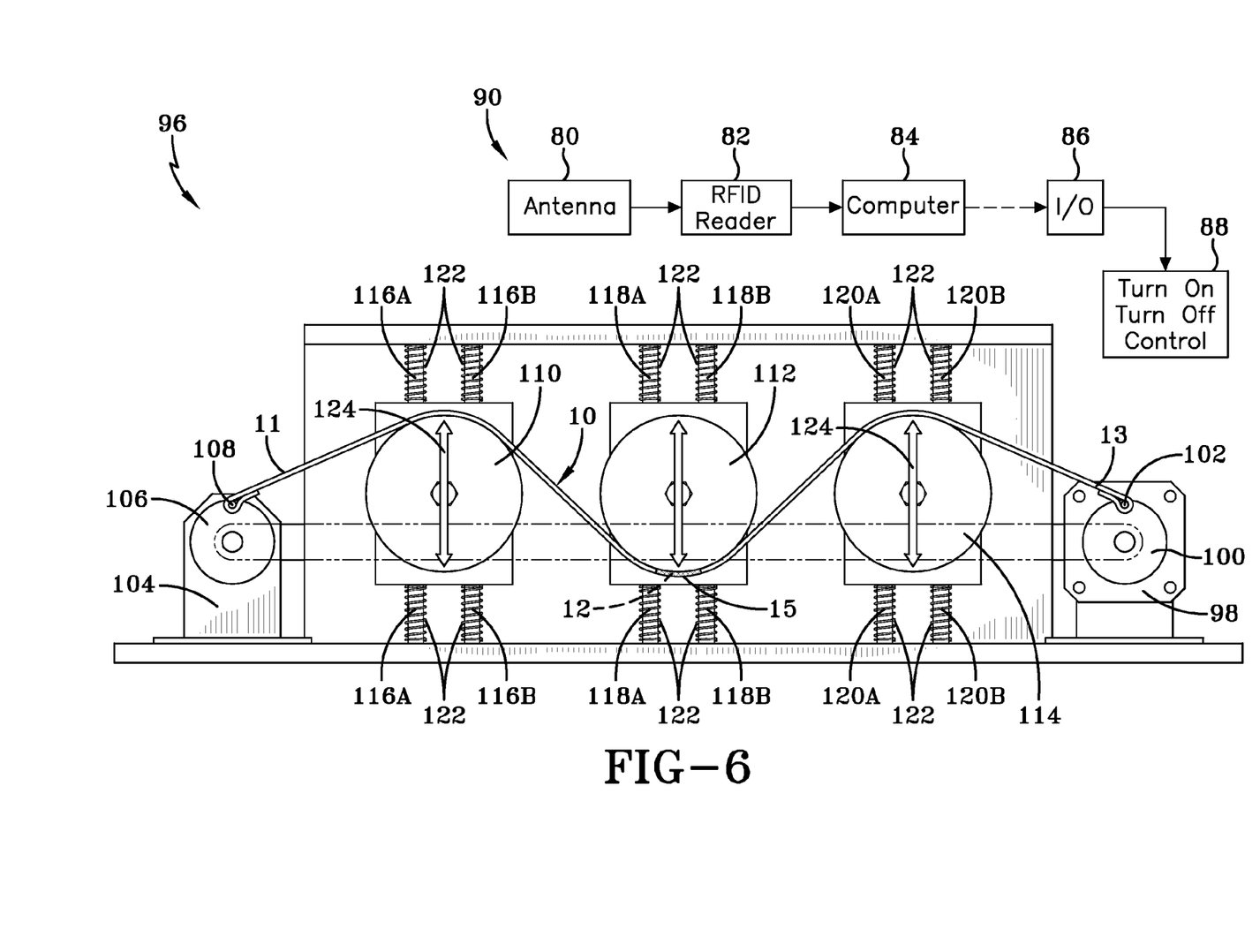
FIG. 6 is a front plan and schematic of a multi-roller alternative embodiment of the testing apparatus prior to the initiation of a test cycle.
Figure 7:
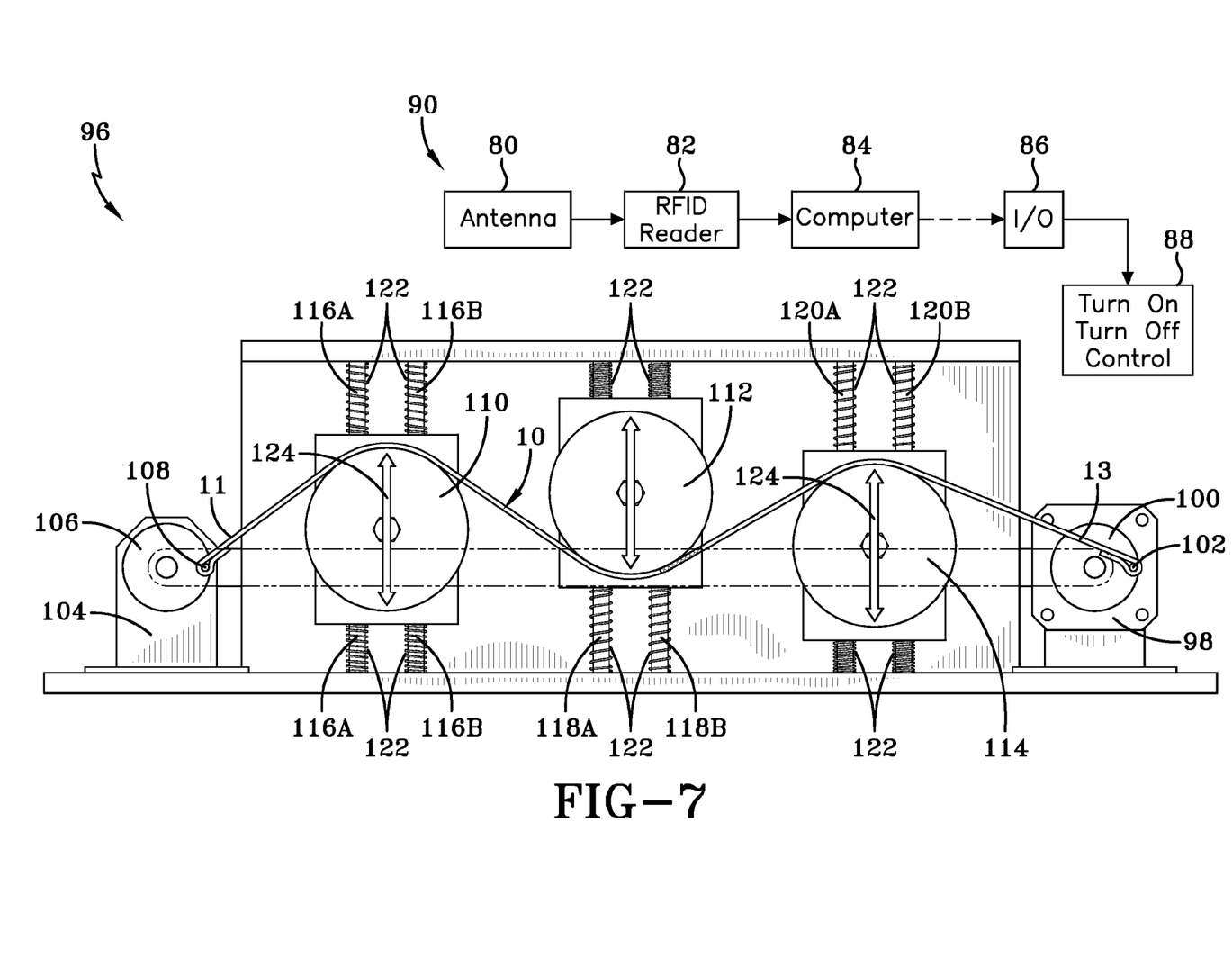
FIG. 7 is a front plan view and schematic of the multi-roller testing apparatus after the testing cycle has commenced.

With reference to FIGS. 6 and 7, a multi-roller alternative embodiment 96 is shown. The multi-roller system 96 allows both stresses and strains to be created and transferred to the RFID tag. As with the previously discussed one roller system, a reader system 90 is employed proximally positioned to the roller array shown. The multi-roller system 96 includes a drive motor 98 rotationally driving a circular plate 100. A pin 102 is secured to the plate 106 and an end portion 13 of a tag sample 10 is anchored to the pin 102. At the opposite end of the system 96, a support pedestal 104 rotationally mounts a second circular plate 106 having a pin member 108 secured thereto. The end portion 11 of the tag sample 10 is anchored and secured to the pin 108. A serially arranged group of three roller members 110, 112, and 114 are positioned adjacent to each other, each mutually spaced apart in line and each supported respectively by two pairs of support posts 116A, B, 118A, B, and 120A, B. Each support post is provided with a surrounding coil spring 122, positioned to engage against a respective roller assembly supported by the post. As shown in FIG. 6, the roller members 110, 112, and 114 define a serpentine path along which the tag sample 10 is routed between plates 100 and 106. FIG. 6 illustrates the position of the tag sample extending along the serpentine path with the system in a quiescent initial state prior to actuation of the motor 98. The springs 122 engaging against opposite ends of a respective roller exert a centering bias against the rollers that initially keeps the rollers in an inline, level mutual relationship shown.

The motor 98 is activated and as the plate 98 rotates clockwise, end 13 is pulled to the right as shown, tensioning the tag sample 10. The actuation of the motor 98 pulling on the tag sample 10 causes the rollers 110, 112, and 114 to realign vertically in the direction 124 shown by arrows in FIG. 7. Rollers 110, 112, and 114 move vertically against the bias of the springs 122 and compress the springs as shown in FIG. 7. The springs 122 serve to impart a biasing force counter to the direction of vertical movement of the rollers and act to keep the bank of three rollers generally in line and centered. The serpentine path that the sample 10 introduces stress and strain into the RFID tag to more accurately reproduce the stress and strain encountered by the tag in a tire.

From the forgoing, it will be appreciated that a reliable, easily administered testing apparatus is provided for mechanically testing the durability of an electronic tag product during simulated use within a tire. The apparatus includes an elongate carrier strip having a longitudinal axis. The strip is composed of a material 22 having material properties simulating an end product tire material within which the tag resides embedded during end product use. The tag being substantially embedded within the carrier strip at a mid-portion 15 between opposite end portions 11, 13 of the strip. The apparatus includes a roller 34 having a convex support surface 50 of a radius intended to simulate a curvature of a product component into which the tag is to be embedded during commercial use. The convex or curved support surface is operationally positioned to support the carrier strip mid-portion 15. A drive mechanism 52 engages the end portions 11,13 of the strip and reciprocally moves the strip mid-portion axially in a forward direction and a reverse direction over the roller curved surface. A reader system 90 is further provided and positioned to receive information transmitted from the electronic tag as the strip mid-portion reciprocally moves in the forward and reverse directions over the apparatus support surface during a testing sequence.

The roller outer surface 50 has a radius of curvature sufficient to stress the electronic tag as the strip mid-portion moves over the apparatus support surface in order to simulate a tire curvature within which the tag resides embedded during use within a tire. A second and a third roller may be mounted within the apparatus frame adjacent to the support roller to define a serpentine path for the carrier strip. The rollers engage the carrier strip mid portion to reproduce a magnitude of stress and strain within the electronic device similar to that experienced in a tire. Throughout cycle testing, the reader detects the presence or absence of transmission error by the electronic device and the results may be processed and stored within a data storage unit for future reference.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A testing apparatus for an electronic tag of a type that transmits information from a host product to a reader during the course of commercial end product use, the apparatus comprising: an elongate carrier strip composed of a material having material properties simulating an end product material within which the tag resides embedded during end product use, the tag being substantially embedded within the carrier strip at a mid-portion between opposite end portions of the strip; at least one apparatus support surface operationally positioned to support the carrier strip mid-portion; strip means engaging the end portions of the strip for reciprocally moving the strip mid-portion in a forward direction and a reverse direction over the apparatus support surface; a reader operationally positioned to receive information transmitted from the electronic tag as the strip mid-portion reciprocally moves in the forward and reverse directions over the apparatus support surface during a testing sequence;

wherein the convex outer surface having a radius of curvature sufficient to stress the electronic tag as the strip mid-portion moves over the apparatus support surface;

wherein the radius of curvature of the convex outer surface simulates a tire curvature within which the tag resides embedded during tire use;

wherein the support roller is mounted within an apparatus frame to reciprocally move against a spring bias in a direction normal to the convex outer surface of the support roller.

2. The testing apparatus of claim 1, wherein the apparatus support surface comprises a convex outer surface of a support roller.

3. The testing apparatus of claim 1, further comprising at least a second roller mounted within the apparatus frame adjacent to the support roller and having a second roller convex outer surface positioned to support the carrier strip mid portion, the second roller convex outer surface defining with the support surface outer surface a serpentine carrier strip mid-portion feed path between the opposite end portions of the strip.

4. The testing apparatus of claim 3, wherein the second roller is mounted within the apparatus frame to reciprocally move against a spring bias in a direction normal to the convex outer surface of the second roller.

5. The testing apparatus of claim 1, wherein the reader operationally detects the presence of transmission error by the electronic device during the testing sequence.

6. A testing apparatus for an electronic tag of a type that transmits information from a host product to a reader during the course of commercial end product use, the apparatus comprising: an elongate carrier strip composed of a material having material properties simulating an end product material within which the tag resides embedded during end product use, the tag being substantially embedded within the carrier strip at a mid-portion between opposite end portions of the strip; at least a first and a second roller positioned mutually adjacent within an apparatus frame, the first and second rollers having oppositely directed outer surfaces defining a serpentine feed path for the carrier strip mid-portion; and the first and second roller outer surfaces supportively engaging the carrier strip mid-portion; carrier strip moving means for engaging the end portions of the strip for reciprocally moving the strip mid-portion in a forward direction and a reverse direction over the first and second roller outer surfaces along the serpentine feed path; and a reader operationally positioned to receive information transmitted from the electronic tag as the strip mid-portion reciprocally moves in the forward and reverse directions over the first and second roller outer surfaces along the serpentine feed path during a testing sequence;

wherein the first and second rollers are mounted within an apparatus frame to reciprocally move against a spring bias in a direction normal to the convex outer surface of the first and second rollers.

* * * * *